United States Patent [19]
Reiley

[11] Patent Number: 5,519,493
[45] Date of Patent: May 21, 1996

[54] REMOTE SAMPLE POLARIMETER

[76] Inventor: Daniel J. Reiley, 1503 Sparkman Dr., Apt. 46, Huntsville, Ala. 35816

[21] Appl. No.: 219,964

[22] Filed: Mar. 30, 1994

[51] Int. Cl.[6] .................................................. G01N 21/21
[52] U.S. Cl. ........................................... 356/367; 356/369
[58] Field of Search ..................................... 356/364, 365, 356/366, 367, 368, 369, 33, 34, 35; 250/225

[56] References Cited

U.S. PATENT DOCUMENTS

| | | | |
|---|---|---|---|
| 3,062,087 | 11/1962 | Zandman et al. | 356/33 |
| 3,177,761 | 4/1965 | Redner | 356/366 |
| 3,474,255 | 10/1969 | White | 356/365 |
| 3,549,259 | 12/1970 | Klatchko | 356/115 |
| 3,556,662 | 1/1971 | Leverstein | 356/114 |
| 3,907,431 | 9/1975 | McDougal | 250/225 |
| 3,938,890 | 2/1976 | Flavell | 250/225 |
| 4,176,951 | 4/1979 | Robert | 356/33 |
| 4,286,843 | 7/1979 | Reyblatt | 350/396 |
| 4,653,924 | 3/1987 | Itonaga | 356/369 |
| 4,849,623 | 7/1989 | Osaki et al. | 356/369 |
| 5,005,977 | 4/1991 | Tomoff | 356/367 |
| 5,209,231 | 5/1993 | Cote | 128/633 |
| 5,247,176 | 9/1993 | Goldstein | 250/338.1 |

FOREIGN PATENT DOCUMENTS 587325   1/1978   U.S.S.R. ................... 356/364

Primary Examiner—Richard A. Rosenberger

[57] ABSTRACT

A polarimeter with a polarization state generator and a polarization state analyzer mounted together on a single rotary mount. This novel structure allows built-in alignment and synchronization of the polarization state analyzer and the polarization state generator. Because of this built-in alignment and synchronization, polarization properties of samples can be measured quickly, accurately, inexpensively, and reliably. The instrument can measure polarization properties of remote samples, without placing the sample inside the instrument. The surrounding lenses and mirrors are designed in such a way that light leaving the instrument will pass through the polarization state generator and light returning into the instrument will pass through the polarization state analyzer and onto a photodetector. Samples can be measured directly in reflection or in small-angle backscatter; or they can be measured in double-pass transmission with the addition of a mirror or retroreflector.

12 Claims, 3 Drawing Sheets

5,519,493

REMOTE SAMPLE POLARIMETER

BACKGROUND—FIELD OF INVENTION

This invention relates to polarimeters, which are instruments that measure the polarization properties of tangible objects such as mirrors, plastics, biological samples, or optical components.

BACKGROUND—UTILITY

The polarization properties of many materials and devices give important information about the quality of the material or device, including information about the thickness, chemical composition, or stress of a material. For example, the retardance of transparent materials such as glass and plastics is proportional to the stress in the material. Similarly, the retardance of certain biological materials such as the human retina is proportional to the thickness of the sample. Thirdly, the quality of many mirrors and lenses is determined by their polarization properties. Furthermore, the quality of retarders such as quarter-wave plates and half-wave plates is largely determined by the accuracy of their retardance. This invention is a useful tool for in each of these applications.

BACKGROUND—DEFINITIONS

A polarimeter measures the polarization properties of samples such as postal wrapping plastic, dielectric thin films, most scattering surfaces, and the human retina. In general, a polarimeter consists of a light source, a photodetector, a polarization state generator on a rotary mount, and a polarization state analyzer on a separate rotary mount. Prior art polarimeters also include a sample compartment. A polarimeter measures a sample's polarization properties by sending a set of polarization states into the sample, then measuring the intensity of light that is passed through a different set of polarization state analyzers.

In all prior art polarimeters, the polarization state generators and polarization state analyzers are built from polarizers and retarders. An especially important class of polarizers and retarders are called "linear homogeneous polarization elements." In linear homogeneous polarization elements, there exist two linear polarization states—at 90 degrees to each other—that are transmitted through the element without the polarization state being changed. These two polarization states are called "eigenpolarizations." In general, a polarizer is an optical element that transmits different polarization states with different intensities. A linear polarizer is a polarizer with linear eigenpolarizations. The pass axis of the a polarizer is parallel to the orientation of the eigenpolarization that is transmitted by the device with the greatest intensity. Similarly, a retarder is an optical element that transmits different polarization states with different phases. A linear retarder has linear eigenpolarizations. The fast axis of a linear retarder is parallel to the to the orientation of the eigenpolarization that is transmitted by the device with the greatest phase accumulation.

A light source for a polarimeter can be a laser, a light-emitting diode, an arc lamp, an incandescent lamp, a glow-bar, or any other light source. In polarimeters, an important part of a light source is the polarization elements that may be affixed to it. For many polarimeter applications, a polarimeter light source can include a fixed polarizer, retarder, or a combination of polarizer and retarder. A light source can be broad-band or narrow band, and can be in the ultra-violet, visible, infrared, or any other region of the electromagnetic spectrum.

A photodetector for a polarimeter can be a photomultiplier tube, photoresistor, photodiode, charge-coupled device or any other device that converts light energy into electrical energy. For polarimeters, an important part of a photodetector is the polarization elements that may be affixed to it. For many polarimeter applications, a polarimeter's photodetector can include a fixed polarizer, retarder, or combination of polarizer and retarder. The exact type of photodetector to choose is determined by factors such as the wavelength of the light source, the speed of the polarimetric signal, the amount of light present, and the cost of the photodetector.

The most important parts of a polarimeter are a polarization state generator and a polarization state analyzer. A polarization state generator sends light of a known polarization state into the sample. Some prior art uses a fixed polarization element for a polarization state generator. For example, in U.S. Pat. No. 3,549,259 (Kiatchko, 1970), a polarization state generator could be a fixed circular polarizer. In other polarimeters, a polarization state generator uses a rotating polarization element to produce a series of polarization states. For example, in U.S. Pat. No. 5,247,176 (Goldstein, 1993), a polarization state generator is a linear polarizer followed by a rotating quarter-wave linear retarder; this combination sends polarization states into the sample with varying ellipticities.

A polarization state analyzer transmits different polarization states with different intensities (for example, acts as a linear polarizer, then as an elliptical polarizer, then as a circular polarizer, then . . . ). The series of polarization analyzers is generally produced by rotating a polarization element. Both the frequency and the phase of this rotation must be welt-controlled with respect to the rotation of the polarization state generator if a polarimeter is to make accurate measurements of the sample's polarization properties in this invention, both the frequency and the phase of this rotation are well-controlled with respect to the rotation of the polarization state generator because the polarization state analyzer and the polarization state generator are mounted on the same rotary mount.

DISCUSSION OF PRIOR ART

The complexity of the polarimeter depends on the assumptions made about the sample. If a priori information is available for the sample, a very simple polarimeter is adequate. If no a priori information is available for the sample, a complicated polarimeter is required. The polarization state generator and the polarization state analyzer are then configured such that the polarization properties of the sample are readily determined by the harmonics of the signal at the photodetector.

An example of a polarimeter that makes no a priori assumptions about the sample is U.S. Pat. No. 5,247,176 (Goldstein, 1993), in this polarimeter, the polarization state generator is a linear polarizer followed by a quarter wave plate on a rotary mount; and the polarization state generator is a quarter wave plate on a second rotary mount followed by a linear polarizer. If the polarizers are aligned and the retarders are rotated at a ratio of 1:5, all polarization properties of the sample can be determined from the harmonics of the signal at the photodetector. In this polarimeter, as in most prior art, the polarization state analyzer and the polarization state generator must be mounted on different rotary mounts. Because the rotation must be accurate, the polarization state analyzer and the polarization state generator are traditionally mounted in stepper motors. This type of configuration usually requires a computer interface, and can often take several minutes to measure a sample's polarization properties. Furthermore, the sample must be placed in the sample compartment. Clearly, a simplification of the measurement process would be desirable. Furthermore, the ability to measure the polarization properties of remote samples would also be desirable. In this invention, the polarization state generator and the polarization state analyzer are mounted on the same rotary mount, allowing both a simplified measurement process and the measurement of samples placed outside of the instrument.

A polarimeter that does use a priori information about the sample is a Faraday rotation measurement device, U.S. Pat. No. 5,209,231 (Cote, 1993). This polarimeter has a greatly simplified structure, but can characterize only one aspect of a sample's polarization properties—circular retardance. In this polarimeter the polarization state generator is a polarizer or a half-wave plate mounted on a rotary mount; the polarization state analyzer is a fixed polarizer on a stationary mount. The sample must be placed inside the instrument. The presence of any polarization properties other than circular retardance will result in an inaccurate measurement. Clearly, a more complete characterization of samples' polarization properties would be desirable in this invention, more complete characterization of the polarization properties is possible—the only a priori assumption used is that the sample is a linear homogeneous polarization element. Furthermore, in this invention, the sample can be outside the instrument.

OBJECTS

This invention quickly, inexpensively, accurately, and reliably characterizes a class of samples called "linear homogeneous polarization elements." In linear homogeneous polarization elements, there exist two linear polarization states—at 90 degrees to each other—that are transmitted through the element without the polarization state being changed. These two polarization states are called "eigenpolarizations."

Many important samples are homogeneous linear polarization elements. These samples include postal wrapping plastic, dielectric thin films, most scattering surfaces, and the human retina. Prior art is either unnecessarily complicated and expensive to readily characterize these samples or is incapable of characterizing these samples fully, quickly, accurately, inexpensively, and reliably. Therefore, there is a need for a polarimeter that can readily characterize the polarization properties of homogeneous linear polarization elements. This invention fulfills this need because the polarization state analyzer and the polarization state generator are mounted on the same rotary mount.

ADVANTAGES OVER PRIOR ART

The advantages over prior art arise from the face that, in this invention, the polarization state analyzer and the polarization state generator are mounted on the same rotary mount. This invention is quicker than prior art because fast motors may be used in the rotary mounts. This invention is more accurate than prior art because there is no way for the polarization state analyzer and polarization state generator to become unsynchronized or misaligned. This invention is less expensive than prior art because inexpensive motors may be used in the rotary mounts, because labor costs of operating the device are reduced due to the built-in alignment. This invention is more reliable than prior art because alignment and synchronization of the polarization state generator and the polarization state analyzer are built into the device, thereby removing the possibility for human error as well as the possibility of equipment malfunction.

This invention has significant and substantial advantages over prior art. The most substantial advantage over prior art is that the polarization state analyzer and polarization state generator are mounted in the same mount. This novel structure is significant because it allows built-in alignment and synchronization of the polarization state generator with the polarization state analyzer. Because of this built-in alignment and synchronization, polarization properties of samples can be measured more quickly, accurately, inexpensively, and reliably than prior art.

In addition, this invention represents new and unexpected results over prior art. In prior art, the sample had to be placed inside the instrument. This invention, on the other hand, provides the new and unexpected result that it can measure polarization properties of samples that are remote from the instrument.

Furthermore, this invention represents a modification and a combination that is unsuggested by prior art polarimeters in all prior art, the polarization state analyzer and polarization state generator are placed on separate mounts. This invention, on the other hand, places the polarization state generator and the polarization state analyzer on the same mount. This unsuggested combination is the essence of the invention and is what allows polarization properties of samples to be measured quickly, accurately, inexpensively, and reliably.

Also, this invention represents a significant improvement over prior art by an omission of an element. Prior art teaches away from the use of a single rotary mount for both the polarization state generator and the polarization state analyzer. This invention, on the other hand, omits the separate mount for the polarization state analyzer and polarization state generator, allowing built-in alignment and synchronization, resulting in quicker, less expensive, more accurate, and more reliable characterization of samples' polarization properties. Prior art also teaches the inclusion of a sample compartment inside the instrument. This invention, on the other hand, allows samples outside the instrument to be measured.

Finally, this invention represents synergism with prior art in polarizers and retarders. This synergism is obtained because rotating a single retarder or polarizer can not adequately characterize polarization properties of samples. Only by using a polarization state analyzer with a different polarization state generator can polarization properties be accurately and fully characterized. This invention provides significant improvement over prior art because of the synergism afforded by passing the light through the two different apertures on the same mount—light leaving the device passes through the polarization state generator; light entering the device passes through the polarization state analyzer.

Further objects and advantages of the invention will become apparent from a consideration of the drawings and the ensuing description.

SUMMARY OF THE INVENTION

These objectives are met by mounting the polarization state analyzer and the polarization state generator together on the same rotary mount so that light leaving the instrument will pass through the polarization state generator and light returning into the instrument will pass through the polarization state analyzer and onto the photodetector. The sample can be measured directly in reflection or in small-angle backscatter; the sample can be measured in double-pass transmission with the addition of a mirror or retroreflector.

BREIF DESCRIPTION OF THE DRAWINGS

The following drawings succinctly describe the invention and are helpful in understanding the detailed description of the invention that follows.

DESCRIPTION OF THE PREFERRED EMBODIMENTS

Figure 1:
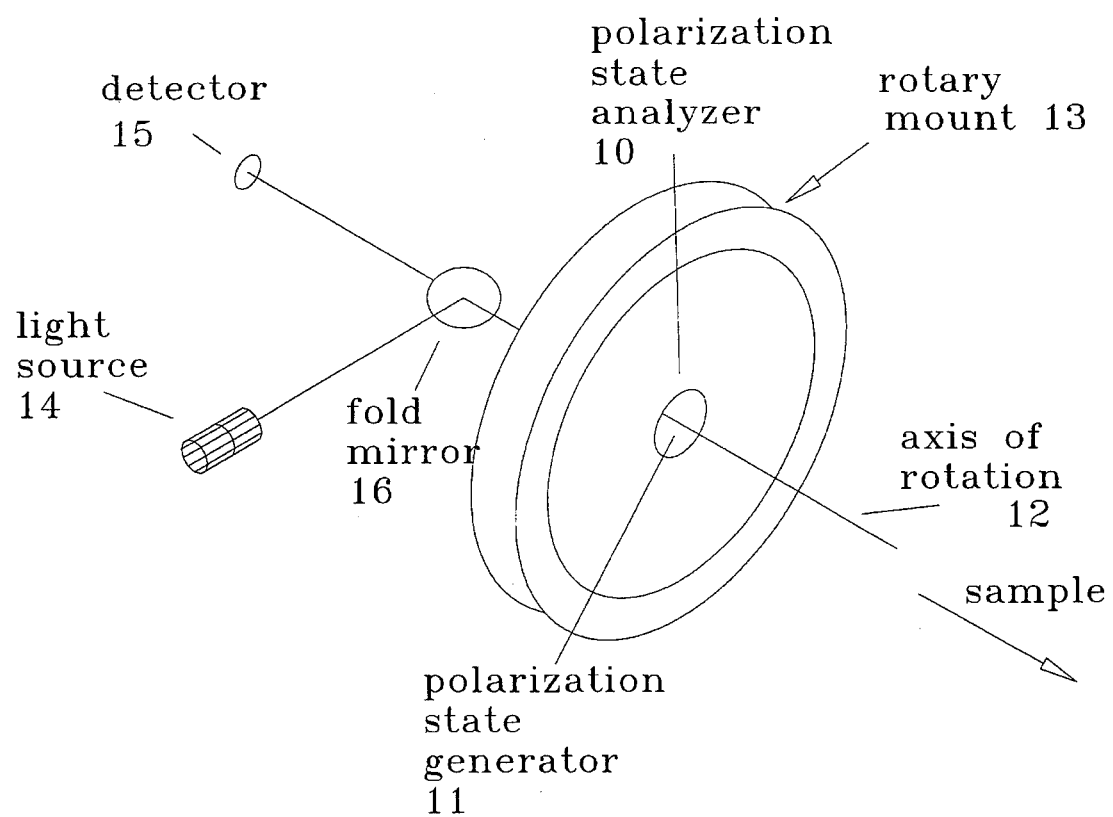
FIG. 1 illustrates the structure of the remote sample polarimeter when the polarization state generator is mounted in a hole in the polarization state analyzer.
Figure 2:
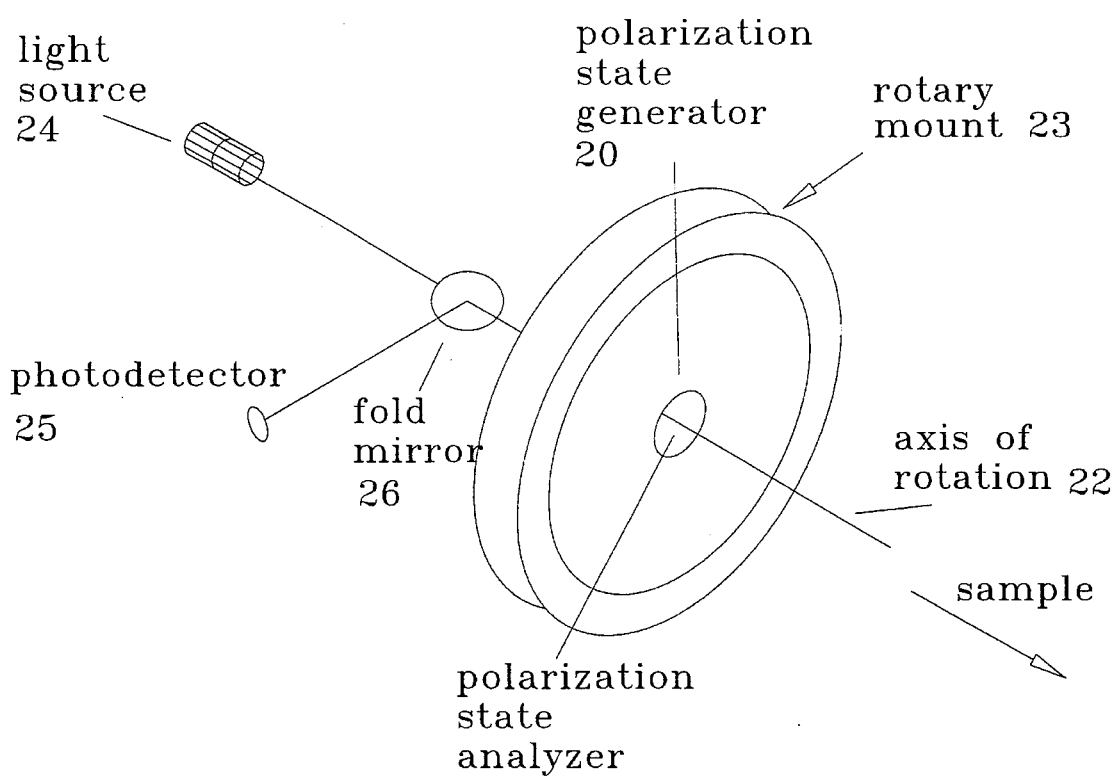
FIG. 2 illustrates the structure of the remote sample polarimeter when the polarization state analyzer is mounted in a hole in the polarization state generator.

Referring now to the drawings, and more particularly to FIG. 1 thereof, there is shown an arrangement of a polarization state analyzer 10 and polarization state generator 11 in which the polarization state generator is mounted in a hole in the polarization state analyzer. Polarization state analyzer 10 and polarization state generator 11 are mounted together on a rotary mount 13 with an axis of rotation 12. FIG. 1 also shows a light source 14, photodetector 15, and fold mirror 16. Similarly, FIG. 2 shows an arrangement of a polarization state analyzer 21 and polarization state generator 20 in which polarization state analyzer 21 is mounted in a hole in polarization state generator 20. Polarization state analyzer 21 and polarization state generator 20 are mounted together on a rotary mount 23 with an axis of rotation 22. FIG. 2 also shows a light source 24 and photodetector 25, and fold mirror 26.

Figure 3:
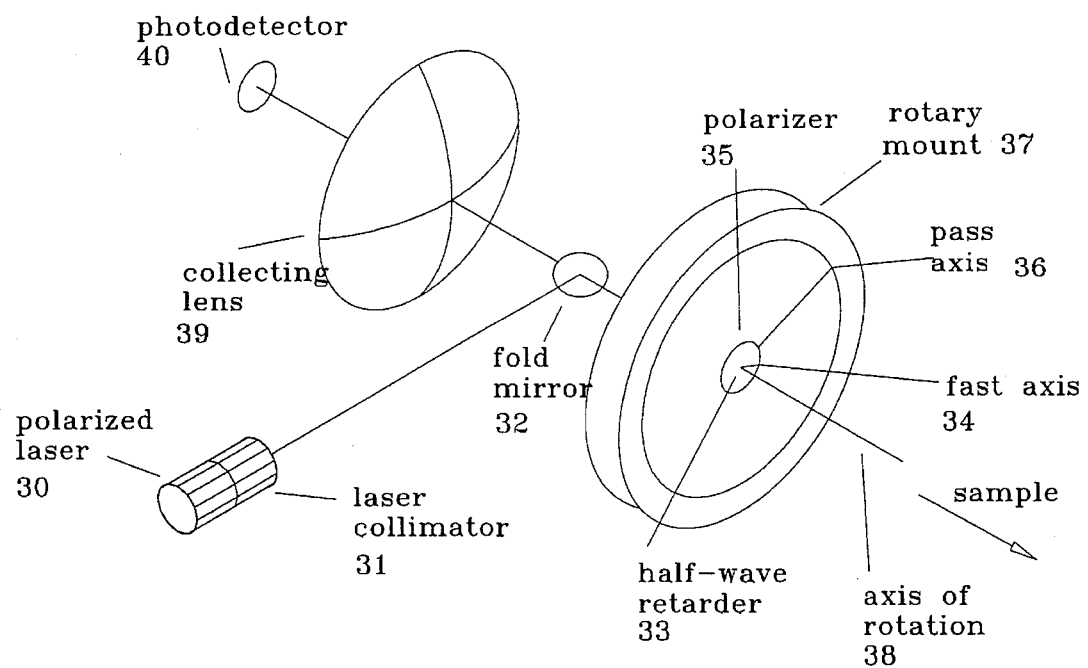
FIG. 3 illustrates one way in which the remote sample polarimeter can be configured to measure polarization properties of a sample.

By choosing the proper type of polarization state generator and polarization state analyzer, the invention is a useful tool for measuring polarization properties of samples. FIG. 3 illustrates one particularly useful configuration of the invention; the polarization state generator is a half-wave linear retarder 33 with a fast axis 34; and the polarization state analyzer is a linear polarizer 35 with a pass axis 36. Linear polarizer 35 and half-wave linear retarder 33 are mounted a rotary mount 37 with axis of rotation 38. FIG. 3 also shows surrounding optics that will produce a beam that passes through polarization state generator 33 when leaving the device and that will focus light entering the device through polarization state analyzer 35 onto photodetector 40: a polarized laser 30, a laser collimator 31, a fold mirror 32, and a collecting lens 39.

OPERATION

In the embodiment shown in FIG. 1, light from a light source 14—which can be a laser, a light-emitting diode, an arc lamp, an incandescent lamp, a glowbar, or any other light source—passes through polarization state generator 11, which is mounted on rotary mount 13. Rotary mount 13 rotates at a frequency v about axis of rotation 12. This rotation causes the polarization state of light incident on the sample to vary harmonically. The light then is scattered off the sample, reflects off the sample, or reflects off a mirror placed after the sample. The light then passes through polarization state analyzer 10, which is also mounted on rotary mount 13 that rotates at a frequency v about axis of rotation 12. This rotation causes the intensity of the light to vary harmonically. The light is focused onto photodetector 15, which can be a photomultiplier tube, photoresistor, photodiode, charge-coupled device or any other device that converts light energy into electrical energy. The polarization properties of the sample are encoded onto the amplitude and phase of the harmonics of the signal at the photodetector.

Similarly, in the embodiment shown in FIG. 2, light from a light source 24—which can be a laser, a light-emitting diode, an arc lamp, an incandescent lamp, a glowbar, or any other light source—passes through polarization state generator 20, which is mounted on rotary mount 23. Rotary mount 13 rotates at a frequency v about axis of rotation 22. This rotation causes the polarization state of light incident on the sample to vary harmonically. The light then is scattered off the sample, reflects off the sample, or reflects off a mirror placed after the sample. The light then passes through polarization state analyzer 21, which is also mounted on rotary mount 23 that rotates at a frequency v about axis of rotation 22. This rotation causes the intensity of the light to vary harmonically. The light is focused onto photodetector 25, which can be a photomultiplier tube, photoresistor, photodiode, charge-coupled device or any other device that converts light energy into electrical energy. The polarization properties of the sample are encoded onto the amplitude and phase of the harmonics of the signal at the photodetector.

In the embodiment shown in FIG. 3, vertical or horizontal linearly polarized light from polarized laser 30 is collimated by laser collimator 31, then reflects off fold mirror 32, and passes through polarization state generator 33, which is a half-wave linear retarder with fast axis 34. Half-wave linear retarder 33 is mounted on rotary mount 37 that rotates at a frequency of v about axis of rotation 38. This rotation generates linear polarization states with an orientation that rotates at a frequency of 2 v. After reflecting off the sample, scattering off the sample, or reflecting off a mirror placed after the sample, the laser beam will have diverged enough to pass through polarization state analyzer 35, which is a linear polarizer with pass axis 36. Linear polarizer 35 is also mounted on rotary mount 37 in such a manner that pass axis 36 of linear polarizer 35 is at a 45 degree angle from fast axis 34 of half-wave linear retarder 33. The rotation of linear polarizer 35 induces an intensity modulation. The light is collected by collecting tens 39 and focused onto photodetector 40. The intensity modulation has several harmonics; polarization properties of the sample are encoded on to the amplitude and phase of these harmonics. This design provides a remarkable improvement over the prior art design of a polarimeter for measuring polarization properties of samples. Polarization properties of a sample can be measured quickly, accurately, and inexpensively because alignment and synchronization of the polarization state generator and the polarization state analyzer are built into the device.

The invention is also useful when other polarization state generators and polarization analyzers are used. For example, the linear diattenuation and linear retardance of the sample can also be readily measured by using a ⅓ wave retarder as a polarization state generator and a linear polarizer as a polarization state analyzer. The important part of this invention is that the polarization state analyzer and the polarization state generator are mounted together on the same rotary mount.

Polarizers for the polarization state generator and the polarization state analyzer may include sheet polarizers, wire gdd polarizers, glass polarizers, crystal polarizers such as Glan-Thompson polarizers, or any other device that has different intensity transmittances for different polarization states. Retarders for the polarization state analyzers may include sheet retarders, stretched glass retarders, retarders made of crystals such as mica, or any other device that induces a phase change in one polarization state with respect to another. The polarization state generator may be any combination of polarizers and retarders. Similarly, the polarization state analyzer may also be any combination of polarizers and retarders.

The mathematical formalism used to determine which polarizers to use is called "Mueller calculus." in this formalism, light's polarization state is represented by a four-element column vector, called a Stoke's vector; and polarization elements are represented by sixteen-element square matrices called Mueller matrices. A person experienced in the art of polarimetry can multiply the proper Mueller matrices and Stokes vectors to determine the proper polarization state generator and polarization state analyzer for measuring the polarization properties of the sample of interest.

Obviously, numerous modifications and variations of the present invention are possible in light of the above teachings. It is therefore to be understood that within the scope of the appended claims, the invention may be practiced otherwise than as specifically described herein.

CONCLUSIONS, RAMIFICATIONS, AND SCOPE

This invention is a polarimeter with the polarization state analyzer and the polarization state generator on the same rotary mount. This novel arrangement has several advantages over prior art:

it can measure polarization properties of samples that are remote from the instrument, eliminating the need for a sample compartment, it allows built-in alignment of the polarization state generator and the polarization state analyzer, and it allows built-in synchronization of the polarization state generator and the polarization state analyzer.

Together, these advantages allow the instrument to characterize samples' polarization properties more quickly, less expensively, more accurately, and more reliably than was possible with prior art. This arrangement is an omission of at least one element that is unsuggested by prior art and, in addition, provides unexpected results.

This invention is quicker than prior art because fast motors may be used in the rotary mounts. This invention is more accurate than prior art because there is no way for the polarization state analyzer and polarization state generator to become unsynchronized or misaligned. This invention is less expensive than prior art because inexpensive motors may be used in the rotary mounts, because labor costs of operating the device are reduced due to the built-in alignment. This invention is more reliable than prior art because alignment and synchronization of the polarization state generator and the polarization state analyzer are built into the device, thereby removing the possibility for human error and of equipment malfunction.

Although the description above contains many specificities, these should not be construed as limiting the scope of the invention, but as merely providing illustrations of some of the presently preferred embodiments of the invention. For example, the polarization state generator may be a half-wave linear retarder and the polarization state analyzer may be a linear polarizer followed by a quarter-wave linear retarder. Similarly, the polarization state generator and the polarization state analyzer may be a combination of polarizers and retarders.

Thus, the scope of the invention should be determined by the appended claims and their legal equivalent, rather than by the examples given.

What is claimed as new and desired to be secured by Letters Patent of the United States is:

1. A device for measuring polarization properties of objects, said device comprising:
   (a) a light source,
   (b) a rotary mount,
   (c) a polarization state generator,
   (d) a polarization state analyzer,
   (e) a photodetector,
   (f) a hole in said polarization state generator,
   (g) a first mounting means for mounting said polarization state analyzer in said hole in said polarization state generator, and
   (h) a second mounting means for mounting said polarization state generator, said polarization state analyzer, and said first mounting means in said rotary mount, whereby light from said light source passes through said polarization state generator; and whereby said polarization state generator, in combination with said rotary mount, produces a time-varying polarization state; and whereby light returning through said polarization state analyzer falls on said photodetector; and whereby said polarization state analyzer, in combination with said rotary mount and said photodetector, produces a time-varying signal from said photodetector; and whereby the frequency spectrum of said time-varying signal is indicative of the polarization properties of the objects through which light from said light source passes.

2. The device of claim 1 wherein said light source is linearly polarized, and said polarization state analyzer is a linear polarizer having a pass axis, and said polarization state generator is a half-wave linear retarder having a fast axis.

3. The device of claim 2 wherein said linear polarizer and said half-wave linear retarder are mounted such that said fast axis of said half-wave linear retarder is at approximately a 45 degree angle to said pass axis of said linear polarizer.

4. A device for measuring polarization properties of objects, said device comprising:
   (a) a light source,
   (b) a rotary mount,
   (c) a polarization state generator,
   (d) a polarization state analyzer,
   (e) a photodetector,
   (f) a hole in said polarization state analyzer,
   (g) a first mounting means for mounting said polarization state generator in said hole in said polarization state analyzer, and
   (h) a second mounting means for mounting said polarization state generator, said polarization state analyzer, and said first mounting means in said rotary mount, whereby light from said light source passes through said polarization state generator; and whereby said polarization state generator, in combination with said rotary mount, produces a time-varying polarization state; and whereby light returning through said polarization state analyzer falls on said photodetector; and whereby said polarization state analyzer, in combination with said rotary mount and said photodetector, produces a time-varying signal from said photodetector; and whereby the frequency spectrum of said time-varying signal is indicative of the polarization properties of the objects through which light from said light source passes.

5. The device of claim 4 wherein said light source is linearly polarized, and said polarization state analyzer is a linear polarizer having a pass axis, and said polarization state generator is a half-wave linear retarder having a fast axis.

6. The device of claim 5 wherein said linear polarizer and said half-wave linear retarder are mounted such that said fast axis of said half-wave linear retarder is at approximately a 45 degree angle to said pass axis of said linear polarizer.

7. A device for measuring polarization properties of objects, said device comprising:

(a) a source means for producing light, (b) a generating means for generating a series of polarization states in the light emanating from said source means, (c) an analyzing means for analyzing light's polarization properties, (d) a rotary means for spinning said generating means and said analyzing means, (e) a photodetector means for converting light energy into electrical energy, (f) a hole in said generating means.

(g) a first mounting means for mounting said analyzing means in said hole in said generating means, and (h) a second mounting means for mounting said generating means, said analyzing means, and said first mounting means in said rotary means, whereby light from said source means passes through said generating means; and whereby said generating means, in combination with said rotary means, produces a time-varying polarization state; and whereby light returning through said analyzing means falls on said photodetector; and whereby said analyzing means, in combination with said rotary means and said photodetector means, produces a time-varying signal from said photodetector means; and whereby the frequency spectrum of said time-varying signal is indicative of the polarization properties of the objects through which light from said source means passes.

8. The device of claim 7 wherein said source means is linearly polarized, and said analyzing means is a linear polarizer having a pass axis, and said generating means is a half-wave linear retarder having a fast axis.

9. The device of claim 8 wherein said linear polarizer and said half-wave linear retarder are mounted such that said fast axis of said half-wave linear retarder is at approximately a 45 degree angle to said pass axis of said linear polarizer.

10. A device for measuring polarization properties of objects, said device comprising:

(a) a source means for producing light, (b) a generating means for generating a series of polarization states in the light emanating from said source means, (c) an analyzing means for analyzing light's polarization properties, (d) a rotary means for spinning said generating means and said analyzing means, (e) a photodetector means for converting light energy into electrical energy, (f) a hole in said analyzing means, (g) a first mounting means for mounting said generating means in said hole in said analyzing means, and (h) a second mounting means for mounting said generating means, said analyzing means, and said first mounting means in said rotary means, whereby light from said source means passes through said generating means; and whereby said generating means, in combination with said rotary means, produces a time-varying polarization state; and whereby light returning through said analyzing means falls on said photodetector; and whereby said analyzing means, in combination with said rotary means and said photodetector means, produces a time-varying signal from said photodetector means; and whereby the frequency spectrum of said time-varying signal is indicative of the polarization properties of the objects through which light from said source means passes.

11. The device of claim 10 wherein said source means is linearly polarized, said analyzing means is a linear polarizer having a pass axis, and said generating means is a half-wave linear retarder having a fast axis.

12. The device of claim 11 wherein said linear polarizer and said haft-wave linear retarder are mounted such that said fast axis of said half-wave linear retarder is at approximately a 45 degree angle to said pass axis of said linear polarizer.

* * * * *